3,344,047
ELECTROLYTIC PREPARATION OF SULFONIC
ACIDS
William C. Neikam, Linwood, Pa., assignor to Sun Oil
Company, Philadelphia, Pa., a corporation of New
Jersey
No Drawing. Filed Oct. 23, 1964, Ser. No. 406,189
7 Claims. (Cl. 204—59)

This invention is a method of preparing sulfonic acids from certain types of unsaturated hydrocarbons. The method of the invention involves cathodic reduction of the hydrocarbon to produce a free radical which subsequently reacts in situ with sulfur dioxide and oxygen to produce a sulfonic acid anion. The latter subsequently reacts in situ with hydrogen ion to produce a sulfonic acid. By way of example 9,10-dihydroanthracene-9,10-disulfonic acid is prepared from anthracene. Likewise, 2-butene-1,4-disulfonic acid can be prepared from butadiene. The sulfonic acids produced by the method of the invention are useful as wetting agents. In addition, aromatic sulfonic acids are useful as starting materials in the preparation of azo dye coupling agents and alkane sulfonic acids are also useful in that they are converted to alcohols when heated with aqueous alkali under pressure, this latter reaction being described in JACS, vol. 53, p. 3407 (1931).

Sulfonic acids are obtained from a hydrocarbon of the type specified hereinafter by electrolyzing the hydrocarbon, at the cathode of an electrolytic cell, at a potential greater than its half-wave potential, i.e., by cathodic reduction, in the presence of (1) an electrolyte, (2) a solvent, and (3) sulfur dioxide and oxygen, and by reacting in situ the sulfonic acid anion thereby formed with hydrogen ion. The half-wave potential is a property which is determined polarographically according to the procedure described in, for example, Kirk and Othmer, Encyclopedia of Chemical Technology, vol. 10, pp. 886–890 (1947). It is the potential of the inflection point of a current potential diagram obtained under the described conditions. It is a measure of the potential a which elecrolytic reaction, usually reduction, takes place in the material in question. The electrolytic reaction which occurs at the cathode is one of reduction, i.e., the addition of one or two electrons, and the potential required to effect same is generally negative. The electrolytic reaction which occurs at the anode is one of oxidation, i.e., the loss of one or two electrons, and the potential required to effect same is generally positive. All half-wave potentials herein are cathodic half-wave potentials and are, in addition, all expressed as potentials relative to a calomel reference electrode.

As described, the electrolytic reaction which occurs in the method of the invention is reduction, i.e., the addition of electrons to the hydrocarbon starting material. More specifically, it is the addition of two electrons. With some hydrocarbon starting materials such as butadiene and sytrene the addition of two electrons thereto occurs at a single potential. In such a case the current-potential diagram referred to above has only a single inflection point and would be referred to by those skilled in the art as having a single wave. Other hydrocarbons such as naphthalene add two electrons in two steps. The first electron adds at a certain potential and the second electron adds at a different and larger potential. For example, the first electron might add at −1.2 volts and the second electron might add at −2.0 volts. In this case the current-potential diagram has two inflection points and would be referred to by those skilled in the art as having two waves. Although it would be technically correct to refer to such a hydrocarbon as having two half-wave potentials, since reduction occurs at each of two different potentials, for the present purpose the term half-wave potential as applied to such a compound means the second or larger half-wave potential, i.e., it means the potential of the second wave or the half-wave potential representing the addition of the second electron. In the above example the half-wave potential for the present purpose is −2.0 volts and not −1.2 volts.

The products obtained according to the invention may be mono or disulfonic acids. Typical reductions which occur in the method of the invention are as follows, using anthracene, butadiene, and styrene as examples of the starting materials.

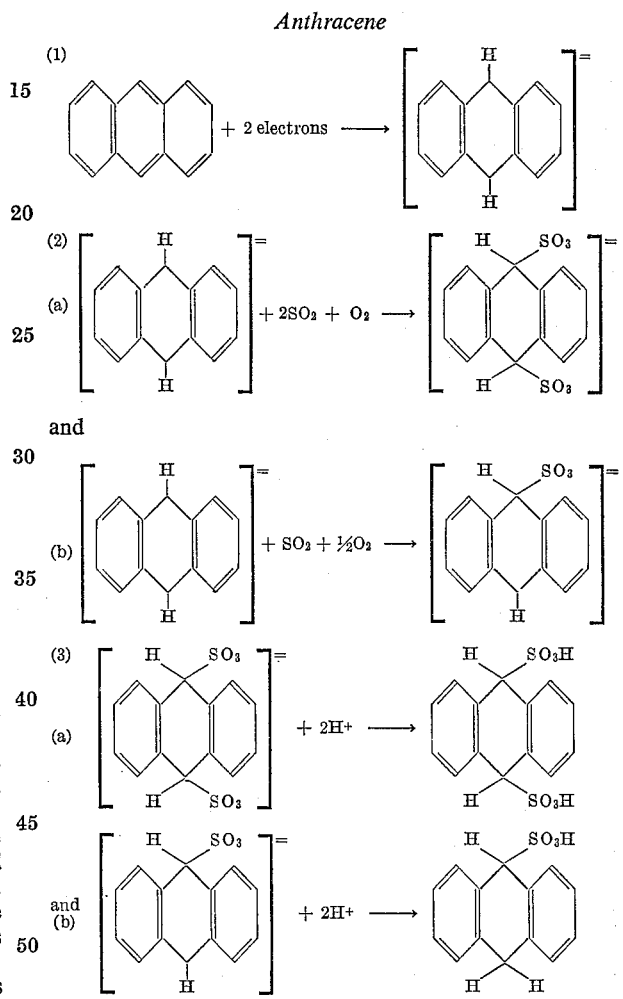

Butadiene (4)
$H_2C=CH-CH=CH_2 + 2$ electrons $\longrightarrow [H_2C-CH=CH-CH_2]^-$ (5) (a)
$[H_2C-CH=CH-CH_2]^- + 2SO_2 + O_2 \longrightarrow [H_2C-CH=CH-CH_2]^-$
$\phantom{[H_2C-CH=CH-CH_2]^- + 2SO_2 + O_2 \longrightarrow [H_2C}\,SO_3\phantom{xxx}SO_3$ and (b)
$[H_2C-CH=CH-CH_2]^- + 2SO_2 + \tfrac{1}{2}O_2 \longrightarrow [H_2C-CH=CH-CH_2]^-$
$\phantom{xxxxxxxxxxxxxxxxxxxxxxxxxxxxxxxxxxxxxxxxx}SO_3$ (6) (a)
$[H_2C-CH=CH-CH_2]^- + 2H^+ \longrightarrow H_2C-CH=CH-CH_2$
$\phantom{xx}SO_3\phantom{xxx}SO_3\phantom{xxxxxxxxxxxxxxx}SO_3H\phantom{xxx}SO_3H$ and (b)
$[H_2C-CH=CH-CH_2]^- + 2H^+ \longrightarrow H_2C-CH=CH-CH_3$
$\phantom{xx}SO_3\phantom{xxxxxxxxxxxxxxxxxxxxxxxxxx}SO_3H$

*Styrene*

(7)
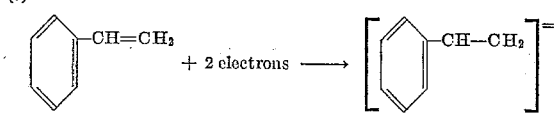

(8) (a)
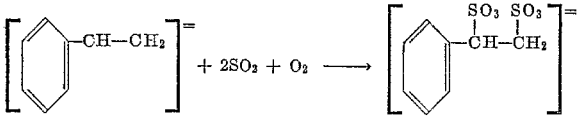

and (b)
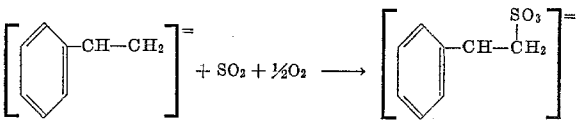

(9) (a)
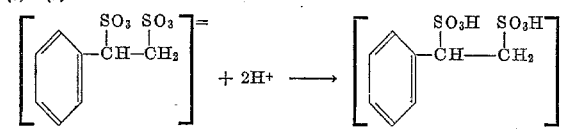

and (b)
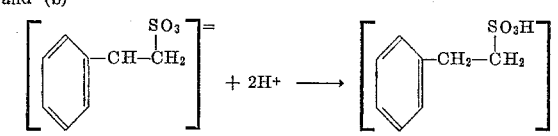

The hydrocarbons which can be converted to sulfonic acids according to the invention are of three general types. One type is non-aromatic hydrocarbons containing conjugated unsaturation. Non-aromatic means that the hydrocarbon does not contain an aryl ring. The hydrocarbon can be cyclic or acyclic, examples of the former being 1,3-cyclohexadiene, 1-vinyl-1-cyclohexene, 5-methyl-1,3-cyclohexadiene, and 1-cyclohexyl-1,3-butadiene and examples of the latter being 1,3-butadiene, vinylacetylene, 1,3-hexadiene, 3-methyl-1,3-hexadiene, 1,3,5-octatriene, 4,5-dimethyl-1,3-octadiene, and the like. Preferably the hydrocarbon contains not more than 12, more preferably 4–8, carbon atoms. Also, the hydrocarbon is preferably an acyclic hydrocarbon with 1,3-butadiene being preferred.

The second type of hydrocarbons suitable for the present purpose is substituted aromatics wherein the substituent contains conjugated unsaturation. A substituent means a non-aromatic hydrocarbon group attached to a nuclear carbon atom of an aryl nucleus. The unsaturation in the substituent can be conjugated with unsaturation in the aryl nucleus as in styrene, α-methylstyrene, vinylnaphthalene, and vinylbiphenyl, or can be conjugated with other unsaturation in the substituent and in 1-phenyl-1,3-butadiene and 1-naphthyl-1,3-hexadiene. The aryl ring to which the substituent containing conjugated unsaturation is attached can, if desired, contain other hydrocarbon substituents as in 1-methyl-3-vinylbenzene, 1,3-diethyl-6-vinylnaphthalene, 1,3-divinylbenzene, and the like. Preferably the substituent containing conjugated unsaturation contains 2–5 carbon atoms and is attached to a benzene or naphthalene nucleus. Preferably there is only one double bond in the substituent which therefore means that the double bond will be conjugated with unsaturation in an aryl nucleus. The aryl nucleus is preferably the benzene or naphthalene nucleus. The nucleus preferably contains no substituents other than the characteristic substituent containing conjugated unsaturation but if any other substituents are present they preferably contain not more than 2 carbon atoms and are preferably alkyl groups rather than alkylene groups, although the latter can be present if desired. Styrene is the preferred hydrocarbon of this second type.

The third type of hydrocarbons suitable for the present purpose is polycyclic hydrocarbons having certain characteristics. One characteristic is that the hydrocarbon contains an aryl ring. Another characteristic is that this aryl ring is condensed with another ring. The other ring can be saturated as in tetralin, can be another aryl ring as in naphthalene, or can be a condensed aryl nucleus as in anthracene. Any of the rings in the polycyclic hydrocarbon can contain substituents, either saturated or unsaturated, but any such substituents are preferably alkyl groups containing 1–2 carbon atoms. The preferred hydrocarbons of this third type are naphthalene and anthracene.

The cathodic reduction of the invention is carried out in the presence of an electrolyte, this being necessary since the hydrocarbon starting materials are not themselves conductive. In addition, it is desirable, but not essential that the electrolyte have a higher half-wave potential than the potential employed in the electrolysis, which in turn will be higher than the half-wave potential of the hydrocarbon starting material, in order to avoid reduction of the electrolyte simultaneously with the desired reduction of the hydrocarbon. This is not essential since reduction of the electrolyte does not prevent reduction of the hydrocarbon also but reduction of the electrolyte represents needless power consumption and often results in the formation of undesirable by-products. The hydrocarbon starting materials of the invention have rather high reduction potentials, i.e., the half-wave potential is a rather large negative voltage. The electrolyte preferably has a higher reduction potential: its half-wave potential should be a larger negative voltage, i.e., more negative, than that of the hydrocarbon. For example, a preferred electrolyte for use when anthracene or butadiene, which have half-wave potentials of −2 and −2.6 volts respectively, are being electrolyzed at a potential of −2.65 volts would be tetraethylammonium bromide which has a half-wave potential of greater than −2.7 volts. Triethanolethylammonium bromide has a half-wave potential of −2.4 volts (see the Schwabe reference mentioned infra) and could therefore be used as electrolyte in the reduction of anthracene without reduction of the electrolyte but could not be so used in the reduction of butadiene.

Selection of the electrolyte so as to avoid reduction of same in practicing the invention requires knowledge of the half-wave potential of various electrolytes. Similarly, selection of the potential employed requires, as more fully discussed hereinafter, knowledge of the half-wave potential of the hydrocarbon starting material. The half-wave potential is a property readily determinable by known procedures. In addition, considerable information concerning half-wave potentials of various hydrocarbons and electrolytes is contained in K. Schwabe, Polarographic and Chemische Konstitution Organischer Verbindungen (1947). Since the tetraalkylammonium halides have half-wave potentials generally higher than the hydrocarbon starting materials of the invention they are the preferred electrolytes.

The cathodic reduction according to the invention is also carried out in the presence of a mutual solvent for both the hydrocarbon and the electrolyte, the use of the solvent being necessary since the electrolyte used is generally insoluble in the hydrocarbon starting material used. As in the case of the electrolyte it is desirable, but not essential, that the solvent have a decomposition potential more negative than the potential employed in the electrolysis, the latter being discussed hereinafter, in order to avoid reduction of the solvent simultaneously with reduction of the hydrocarbon. Decomposition potential is defined in the aforesaid Kirk and Othmer reference and constitutes the potential at which the current begins to turn sharply upward. In the case of a solvent, the decomposition potential is more meaningful than is the half-wave potential since the solvent frequently does not exhibit the typical S-shaped curve that admits of the determination of the half-wave potential. As with half-wave potential, the decomposition potential is negative for cathodic decomposition and positive for anodic decomposition. All decomposition potentials referred to herein are for cathodic decomposition.

Similarly to the half-wave potential, decomposition potential is a property which is readily determinable by known procedures, and the criteria for selection of a preferred solvent are therefore available to a person skilled in the art. The preferred solvents for the present purpose are dioxane, aqueous dioxane, dimethylacetamide, acetonitrile, and dimethylformamide since these solvents have decomposition potentials higher, i.e., more negative, than −3 volts which is substantially higher than the potentials which will be employed in most cases. More preferably the solvent is dimethylformamide.

As described previously the electrolysis is also carried out in the presence of $SO_2$ and $O_2$. The $SO_2$ and $O_2$ can be added to the electrolysis medium, i.e., to the solution of the hydrocarbon and electrolyte in the solvent, in any manner desired, but it is generally most convenient to merely bubble gaseous $SO_2$ and gaseous $O_2$ into the electrolysis medium. The amount of $SO_2$ consumed and the amount of $O_2$ consumed will vary but will depend primarily upon the rate at which the hydrocarbon starting material is reduced. The molar ratio of $SO_2$ consumed to $O_2$ consumed will be about 2:1 as is apparent from an examination of Equations 1–9 supra. Consequently the $SO_2$ and $O_2$ are normally charged to the electrolysis medium in this same ratio.

The electrolysis as described above produces a sulfonic acid anion which is then converted to sulfonic acid by reaction in situ with hydrogen ion. See, for example, Equations 1–9 supra. One suitable means of supplying this hydrogen is to add water or other hydrogen ion producing compound to the electrolyzed solution after completion of the electrolysis. In other words, after the solution has been electrolyzed the potential can be shut off and the sulfonic acid anion can then be reacted with water to produce sulfonic acid. This use of water to supply the hydrogen ion for converting the sulfonic acid anion to sulfonic acid is not essential because the required hydrogen ion will almost invariably be abstracted from the solvent and/or electrolyte simultaneously with the formation of the sulfonic acid anion. In other words the solvent, e.g., dimethylformamide, acetonitrile, dimethylacetamide, etc. and/or electrolyte will liberate hydrogen ion under the conditions of electrolysis. So also will compounds such as methanol or ethanol and even though these latter materials are generally not suitable as solvents they can be added to the electrolysis medium in order to supply hydrogen ion.

The potential employed should be greater than the half-wave potential of the hydrocarbon starting material. This requirement is, of course, inherent in the term cathodic reduction. Also as described hereinbefore, the potential employed is preferably less negative than both the decomposition potential of the solvent and the half-wave potential of the electrolyte. Relatively high potentials often tend to favor, especially in the case of starting materials which have a two-wave current-potential diagram, the formation of disulfonic acid whereas relatively low potentials often tend to favor the formation of monosulfonic acid. Consequently, where monosulfonic acid is desired (see, e.g., Equations (2b) and (3b) hereinbefore), the potential is preferably about 0.1 volt higher than the half-wave potential of the hydrocarbon. Where disulfonic acid is desired (see, e.g., Equations (2a) and (3a) hereinbefore), slightly higher potentials should be used. In any event the potential should be more negative than the half-wave potential of the hydrocarbon starting material; otherwise, no cathodic reduction will occur.

During the electrolysis the hydrocarbon must be present at the surface of the cathode. This requirement is, of course, inherent in the term cathodic reduction. Preferably the electrodes are separated by a diaphragm which is permeable to the solvent and electrolyte but impermeable to the hydrocarbon starting material in order to prevent migration of the starting material to the anode and oxidation at that electrode. Conventional diaphragm materials such as porous Alundum can be used for this purpose.

The temperature of the electrolysis is not critical and can vary considerably. Preferably the temperature is in the range of −30° C. to 40° C. although higher temperatures, e.g., 125° C., or somewhat lower temperatures, e.g., −50° C., can be employed if desired. The preferred temperature is about room temperature (25° C.). If the hydrocarbon starting material is normally gaseous such as butadiene (B.P.=−3° C.) the conditions of temperature and pressure should be selected so as to maintain the hydrocarbon in liquid phase during the electrolysis.

The pressure under which the electrolysis is carried out is also not critical. The use of elevated pressure permits higher concentrations of $SO_2$ and $O_2$ to be maintained in the electrolysis medium and this in turn tends to favor the formation of disulfonic acid. Elevated pressure will also often be used for the reasons mentioned above when the starting material is normally gaseous. Normally the pressure will not exceed 200 p.s.i.g. but can if desired be as high as, e.g., 500 p.s.i.g.

A variety of materials can be used as the electrodes. Examples of suitable materials are zinc, lead, tin, mercury, cadmium, etc. as the cathode and platinum, palladium, gold, etc. as the anode. Mercury is the preferred cathode.

The sulfonic acid produced in the electrolysis can be separated from the solution of unreacted hydrocarbon, electrolyte, and solvent by any suitable procedure. If the starting material is normally gaseous it can generally be readily distilled from the solution after which the sulfonic acid can generally be separated from the electrolyte and solvent by fractional crystallization. If the starting material is not normally gaseous a mixture of unreacted hydrocarbon and the sulfonic acid can usually be separated from the electrolyte and solvent by fractional crystallization from which mixture the sulfonic acid can be separated from unreacted hydrocarbon by either a subsequent fractional crystallization or by extraction with water. Any other suitable procedure can also be employed such as vacuum distillation of the solvent-electrolyte mixture followed by extraction of sulfonic acid from unreacted hydrocarbon with water. Alternatively the solution of sulfonic acid, solvent, electrolyte, and unreacted hydrocarbon can be passed through a chromatographic column and the sulfonic acid thereby separated.

The following examples illustrate the invention more specifically:

EXAMPLE 1

The electrolysis cell contains a pool of mercury on the bottom as the cathode and a platinum anode. A porous Alundum diaphragm separates the cell into an anode chamber and a cathode chamber. The anolyte is a 0.15 molar solution of tetrabutylammonium bromide in dimethylformamide. The half-wave potential of tetrabutylammonium bromide is greater than −3 volts. The catholyte is a similar solution saturated at 25° C. with anthracene. The cell contains means for bubbling $SO_2$ and $O_2$ simultaneously into the catholyte as well as means for controlling the temperature of both the anolyte and catholyte. The cell can be operated as either an open or closed cell, the latter arrangement being used when it is desired to conduct the electrolysis under pressure.

The above described anthracene solution is maintained at 25° C. while being electrolyzed at atmospheric pressure and at a potential of −2.3 volts for a period of 8 hours. $SO_2$ and $O_2$ are continuously bubbled into the catholyte during the electrolysis, the molar ratio of $SO_2$ to $O_2$ being about 2:1.

The product is a solution of 9,10-dihydroanthracene-9,10-disulfonic acid, anthracene, and tetrabutylammonium bromide in dimethylformamide. Anthracene and the disulfonic acid are separated from the quaternary salt and the amide by fractional crystallization and the disulfonic acid is then separated from the anthracene by extraction with water. The aqueous extract phase containing the disulfonic acid is then cooled to crystallize the disulfonic acid and the latter is separated by filtration. The yield of the disulfonic acid is 14.8% based on the anthracene starting material.

EXAMPLE 2

The procedure is the same as in Example 1 except that the catholyte contains styrene instead of anthracene, the amount of styrene being 5% by weight of the electrolyte-solvent mixture in the catholyte, and the potential employed is −2.9 volts. The half-wave potential of styrene is −2.5 volts.

The product is a solution of 1-phenyl-2-ethane monosulfonic acid, 1-phenyl-1,2-ethane disulfonic acid, styrene, and tetrabutylammonium bromide in dimethyl formamide. The solution is separated into its components by elution chromatography on an alumina chromatographic column. The total yield of sulfonic acid is 12% based on styrene. Approximately 65% of the sulfonic acid produced is disulfonic acid.

EXAMPLE 3

The procedure is the same as in Example 1 except that the catholyte contains 1,3-butadiene instead of anthracene, the amount of 1,3-butadiene being 5% by weight of the electrolyte solvent mixture in the catholyte, and the electrolysis is at −2.7 volts rather than −2.3 volts. Also, the electrolysis is conducted under an $SO_2$-$O_2$ pressure of 100 p.s.i.g. and at a temperature of −20° C.

The product is a solution of 2-butene-1,4-disulfonic acid, 2-butene-1-monosulfonic acid, unreacted 1,3-butadiene and tetrabutylammonium bromide in dimethylformamide. The 1,3-butadiene is removed from the solution by heating the latter at atmospheric pressure. The sulfonic acids are separated from the remaining solution by fractional crystallization and are purified by recrystallization from water. The total yield of sulfonic acid is 16.9% based on the 1,3-butadiene.

Generally similar results are obtained with other hydrocarbons of the type specified herein and with other electrolytes and solvents.

The invention claimed is:

1. Method of preparing sulfonic acid in an electrolytic cell containing an anode and a cathode which comprises electrolyzing a compound selected from the group consisting of non-aromatic hydrocarbons containing conjugated unsaturation, substituted aromatic hydrocarbons wherein the substituent contains conjugated unsaturation, and polycyclic hydrocarbons having a condensed aromatic ring, said electrolyzing being (1) in the presence of an electrolyte, (2) in the presence of a mutual solvent for said electrolyte and said compound, (3) in the presence of sulfur dioxide and oxygen, and (4) at a potential more negative than the half-wave potential of said compound, said compound being present at the surface of said cathode during said electrolyzing, whereby a sulfonic acid anion is produced, and reacting said sulfonic acid anion in situ with hydrogen ion to form sulfonic acid.

2. Method according to claim 1 wherein said compound is 1,3-butadiene.

3. Method according to claim 1 wherein said compound is styrene.

4. Method according to claim 1 wherein said compound is naphthalene.

5. Method according to claim 1 wherein said compound is anthracene.

6. Method according to claim 1 wherein said solvent is dimethylformamide.

7. Method according to claim 1 wherein said electrolyte is a tetraalkylammonium halide.

References Cited

UNITED STATES PATENTS 3,214,356  10/1965  Loveland _____ 204—59 X

HOWARD S. WILLIAMS, *Primary Examiner.*